(12) United States Patent
Maeda et al.

(10) Patent No.: US 12,097,982 B2
(45) Date of Patent: Sep. 24, 2024

(54) LANDING DEVICE

(71) Applicant: SONY GROUP CORPORATION, Tokyo (JP)

(72) Inventors: Takashi Maeda, Tokyo (JP); Hiroki Sato, Tokyo (JP); Tatsuo Makii, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/000,291

(22) PCT Filed: May 27, 2021

(86) PCT No.: PCT/JP2021/020126
§ 371 (c)(1),
(2) Date: Nov. 30, 2022

(87) PCT Pub. No.: WO2021/251156
PCT Pub. Date: Dec. 16, 2021

(65) Prior Publication Data
US 2023/0294852 A1    Sep. 21, 2023

(30) Foreign Application Priority Data

Jun. 10, 2020 (JP) ................................ 2020-101006

(51) Int. Cl.
*B64U 70/00* (2023.01)
*B64C 25/24* (2006.01)

(52) U.S. Cl.
CPC .............. *B64U 70/00* (2023.01); *B64C 25/24* (2013.01)

(58) Field of Classification Search
CPC ........ B64U 70/00; B64U 60/50; B64U 10/14; B64C 25/24; B64C 25/32;
(Continued)

(56) References Cited

U.S. PATENT DOCUMENTS

| 4,491,846 A * | 1/1985 | Buse ...................... H01Q 21/28 |
| | | 343/882 |
| 2017/0297738 A1* | 10/2017 | von Flotow ............. B64D 1/12 |

FOREIGN PATENT DOCUMENTS

| JP | 58-001303 A | 1/1983 |
| JP | 2009-063167 A | 3/2009 |

(Continued)

OTHER PUBLICATIONS

KR-101644618-B1 Translation (Year: 2016).*
(Continued)

*Primary Examiner* — Richard Green
*Assistant Examiner* — Steven J Shur
(74) *Attorney, Agent, or Firm* — CHIP LAW GROUP (57) ABSTRACT

The present disclosure relates to a landing device capable of allowing an unmanned aerial vehicle to be accommodated in a compact manner. A landing device includes a first leg portion that is swingable with a first end portion on a main body side of an unmanned aerial vehicle as an axis; and a second leg portion that is detachably attached to a second end portion of the first leg portion such that the second leg portion extends in an axial direction of the first leg portion. The present disclosure can be applied to, for example, a drone including a camera at a bottom of a main body.

11 Claims, 13 Drawing Sheets

(58) Field of Classification Search
CPC ........ B64C 2025/008; B64C 2025/325; B64C 25/10; B64C 39/024; F16B 7/04; F16B 7/20
See application file for complete search history.

(56) References Cited

FOREIGN PATENT DOCUMENTS

| | | | | |
|---|---|---|---|---|
| JP | 2012077852 A | * | 4/2012 | ............. A01G 3/033 |
| JP | 2016-219941 A | | 12/2016 | |
| KR | 101644618 B1 | * | 8/2016 | ........... B64C 39/024 |

OTHER PUBLICATIONS

JP-2012077852-A Translation (Year: 2012).*
International Search Report and Written Opinion of PCT Application No. PCT/JP2021/020126, issued on Jun. 22, 2021, 09 pages of ISRWO.

* cited by examiner

LANDING DEVICE

CROSS REFERENCE TO RELATED APPLICATIONS

This application is a U.S. National Phase of International Patent Application No. PCT/JP2021/020126 filed on May 27, 2021, which claims priority benefit of Japanese Patent Application No. JP 2020-101006 filed in the Japan Patent Office on Jun. 10, 2020. Each of the above-referenced applications is hereby incorporated herein by reference in its entirety.

TECHNICAL FIELD

The present disclosure relates to a landing device, and more particularly, to a landing device capable of allowing an unmanned aerial vehicle to be accommodated in a compact manner.

BACKGROUND ART

In recent years, use of a small unmanned aerial vehicle (so-called drone) that performs flight by remote control or autonomous flight based on position information acquired by a global positioning system (GPS) or the like has increased. A drone equipped with a camera is used for aerial photographing for imaging landscapes and the like on the ground from above. Recently, drones have also been used for topographic surveying and the like.

The drone is provided with a landing device (also referred to as a landing gear or the like) for supporting the drone on the ground. Some landing devices are configured to be capable of being lifted and lowered so as not to disturb imaging or surveying during the flight of the drone.

As a mechanism for supporting an object, for example, Patent Document 1 discloses a spreader for a stand in which one end of an arm is attached to a main body by jointing, and the other end is detachably connected to a support leg of the stand by a lock element.

CITATION LIST

Patent Document

Patent Document 1: Japanese Patent Application Laid-Open No. 2009-63167

SUMMARY OF THE INVENTION

Problems to be Solved by the Invention

The landing device needs to have a length that prevents a camera or a surveying instrument mounted on the bottom of the main body of the drone from contacting the ground at the time of landing of the drone. However, in a case where the drone is accommodated, it is necessary to prepare an accommodation case having a size corresponding to the length of the landing device.

The present disclosure has been made in view of such a situation, and an object of the present disclosure is to make it possible to accommodate an unmanned aerial vehicle in a compact manner.

Solutions to Problems

A landing device of the present disclosure includes a first leg portion that is swingable with a first end portion on a main body side of an unmanned aerial vehicle as an axis; and a second leg portion that is detachably attached to a second end portion of the first leg portion such that the second leg portion extends in an axial direction of the first leg portion.

In the present disclosure, the first leg portion is configured to be swingable with the first end portion on the main body side of the unmanned aerial vehicle as an axis, and the second leg portion is detachably attached to the second end portion of the first leg portion so as to extend in an axial direction of the first leg portion.

MODE FOR CARRYING OUT THE INVENTION

Hereinafter, modes for carrying out the present disclosure (hereinafter, referred to as embodiments) will be described. Note that the description will be given in the following order.

1. Appearance of drone
2. Appearance of landing device
3. Configuration of attachment member
4. Configuration and operation of expansion and contraction link portion <1. Appearance of Drone>

Figure 1:
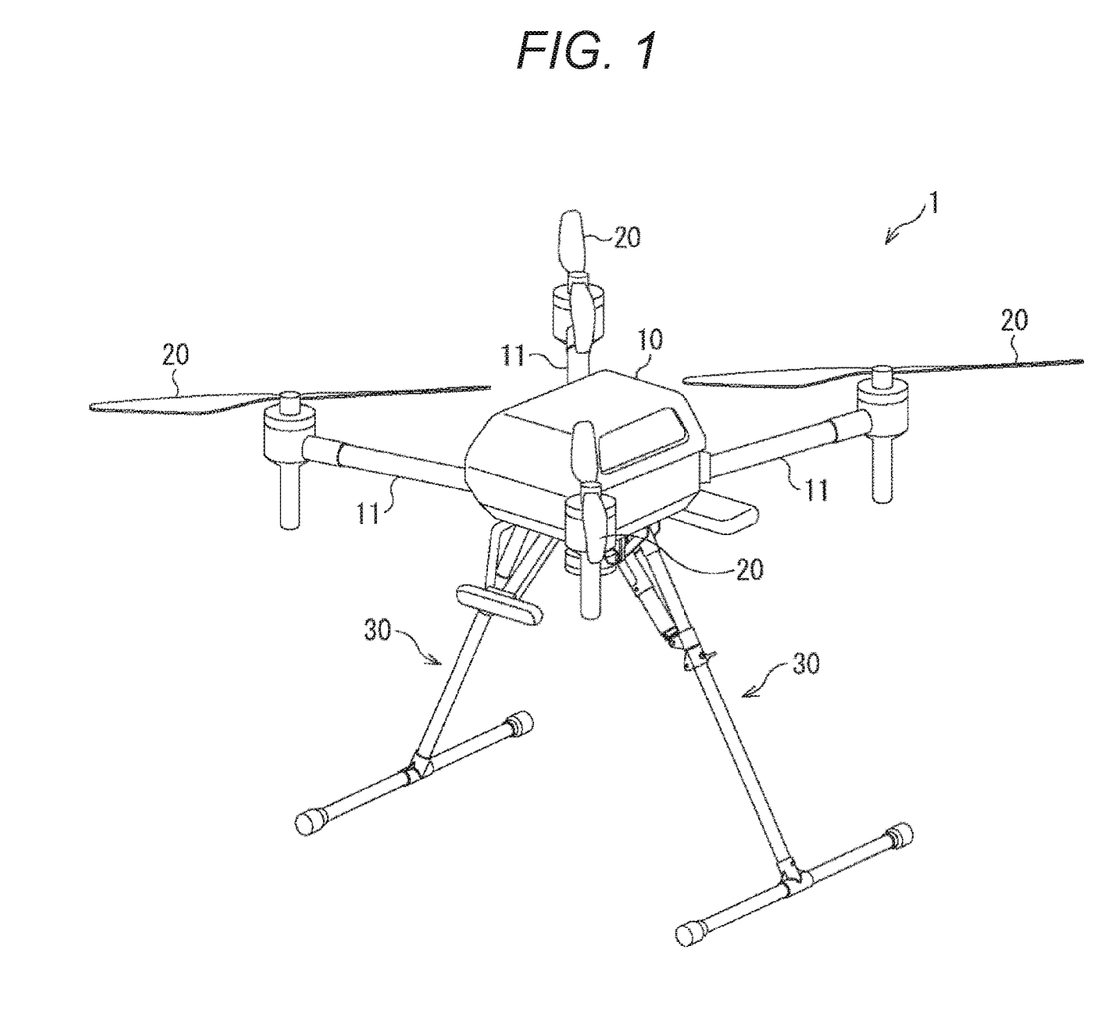
FIG. 1 is a perspective view illustrating an appearance of a drone according to an embodiment.

FIG. 1 is a perspective view illustrating an appearance of a drone as an unmanned aerial vehicle according to an embodiment.

A drone 1 illustrated in FIG. 1 includes a main body 10, and a plurality of (four in the present embodiment) frame portions 11 extending from the main body 10. Furthermore, the drone 1 includes a propeller 20 at a distal end of the frame portion 11 (an end portion that is not on the main body 10 side). The propeller 20 is rotated by a motor (not illustrated) mounted inside the distal end of the frame portion 11.

Various electric component units are mounted inside the main body 10 and the frame portion 11. Specifically, a receiving unit, a controller, a sensor unit, a battery unit, and the like are mounted inside the main body 10. Inside the frame portion 11, a drive control unit that controls driving of the motor that rotates the propeller 20, and the like are mounted.

Furthermore, although not illustrated, the drone 1 is mounted with an aerial photography camera connected to the bottom of the main body 10 via a gimbal that can be driven by the control of the controller described above.

Moreover, the drone 1 includes a plurality of (two in the present embodiment) landing devices 30, which supports the main body 10 on the ground, at the bottom of the main body 10. The landing device 30 has a length that prevents the aerial photography camera mounted on the bottom of the main body 10 of the drone 1 from contacting the ground at the time of landing of the drone 1. Furthermore, the landing device 30 is configured to be capable of being lifted and lowered so as not to disturb imaging by the aerial photography camera during the flight of the drone 1.

<2. Appearance of Landing Device>

Figure 2:
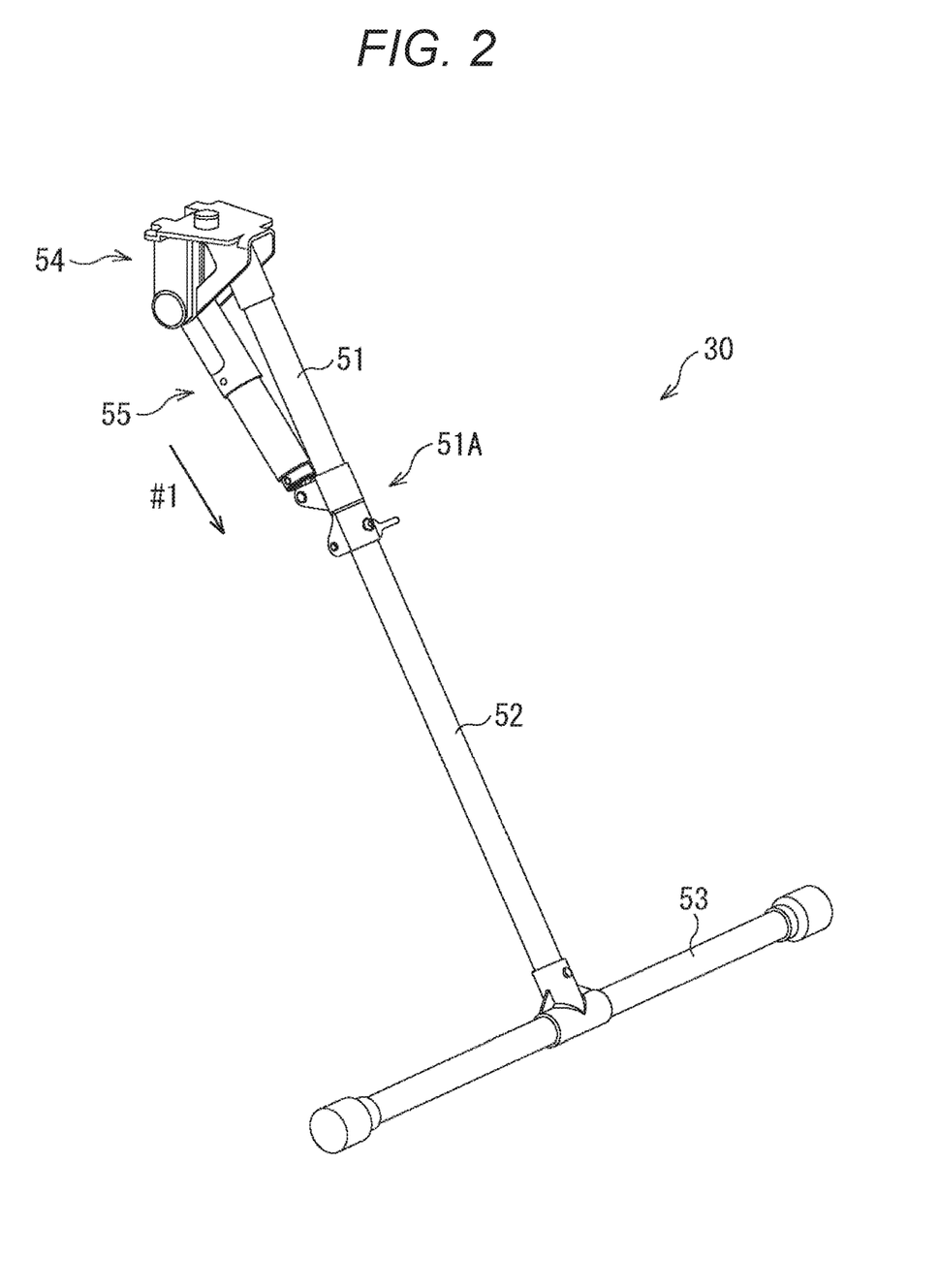
FIG. 2 is a perspective view illustrating an appearance of a landing device to which the technology according to the present disclosure is applied.

FIG. 2 is a perspective view illustrating an appearance of the landing device 30 to which the technology according to the present disclosure is applied.

As illustrated in FIG. 2, the landing device 30 includes a first leg portion 51, a second leg portion 52, a grounding portion 53, a connection portion 54, and an expansion and contraction link portion 55.

The first leg portion 51 is formed in a rod shape (hollow tubular shape). The first leg portion 51 is configured to be swingable with an end portion (first end portion) on the main body 10 side of the drone 1 as an axis by connecting the first end portion to the main body 10 via the connection portion 54.

An attachment member 51A is provided at an end portion (second end portion) of the first leg portion 51, which is not on the main body 10 side, and the second leg portion 52 formed in a rod shape (hollow tubular shape) is attached to extend in an axial direction of the first leg portion 51 via the attachment member 51A. The second leg portion 52 is formed to be longer than the first leg portion 51, for example, to have a length of about twice that of the first leg portion 51.

The grounding portion 53 formed in a rod shape (hollow tubular shape) is joined to an end portion of the second leg portion 52, which is not on the first leg portion 51 (attachment member 51A) side. The grounding portion 53 is joined to the second leg portion 52 so as to form a T-shape, and directly contacts the ground at the time of landing of the drone 1. The second leg portion 52 and the grounding portion 53 may be configured to be separable (detachable).

Hereinafter, the state of the landing device 30 illustrated in FIG. 2 is referred to as a leg lowered state. At the time of landing of the drone 1, by bringing the landing device 30 into the leg lowered state, it is possible to prevent the aerial photography camera mounted on the bottom of the main body 10 of the drone 1 from contacting the ground.

An end portion of the expansion and contraction link portion 55, which is on the main body 10 side of the drone 1 is connected to an axis of the connection portion 54, which is provided to a side closer to the ground than the axis to which the first leg portion 51 is connected. An end portion of the expansion and contraction link portion 55, which is not on the main body 10 side, is connected to the attachment member 51A (second end portion of the first leg portion 51). That is, the expansion and contraction link portion 55 constitutes a three-node link mechanism together with the first leg portion 51 and the connection portion 54.

Figure 3:
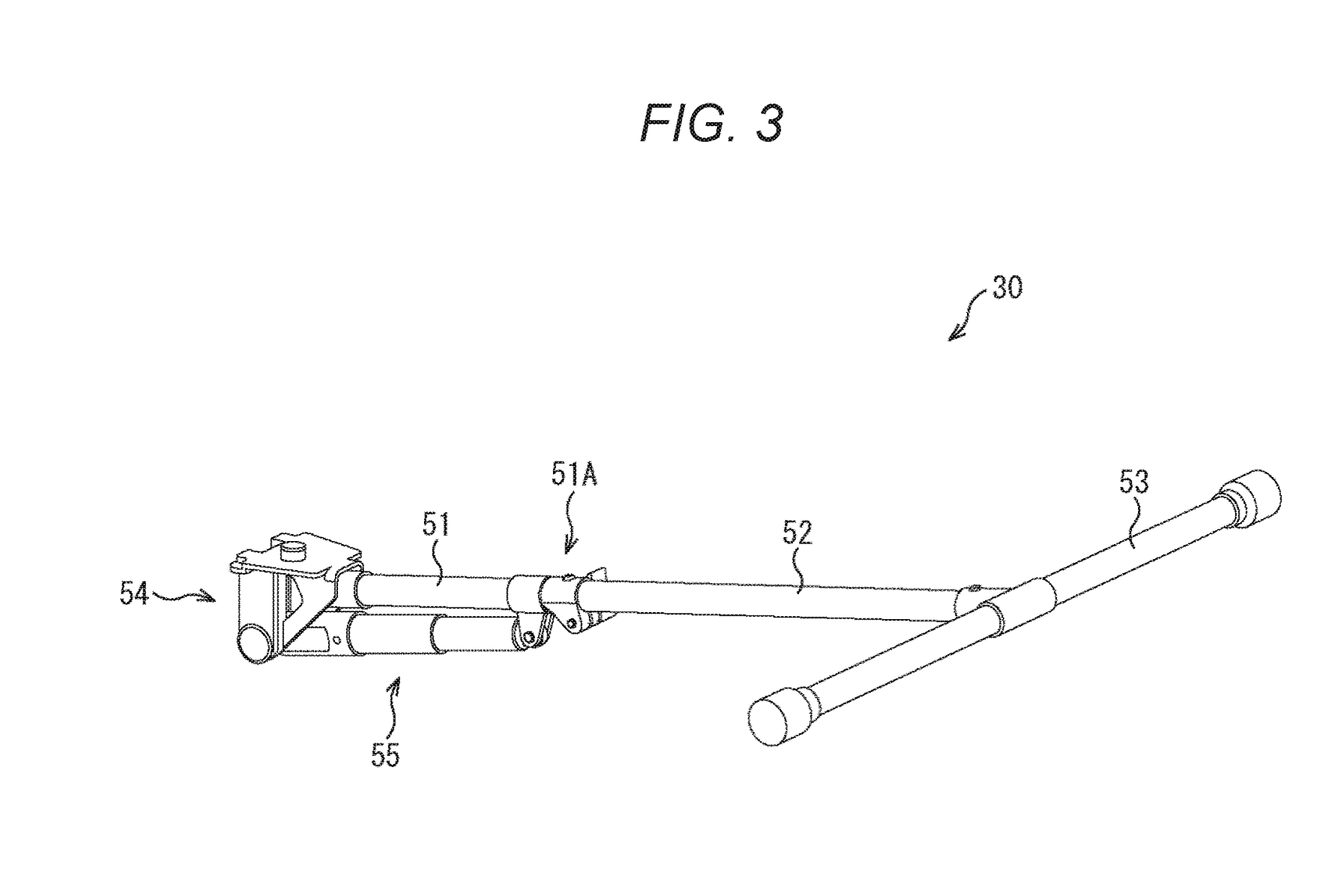
FIG. 3 is a view illustrating the landing device in a leg lifted state.

In this link mechanism, the connection portion 54 functions as a fixed link, and the expansion and contraction link portion 55 extends in a direction of arrow #1 in the drawing, so that the first leg portion 51 to which the second leg portion 52 is attached is lifted up so as to be pushed up from the ground side as illustrated in FIG. 3.

Figure 4:
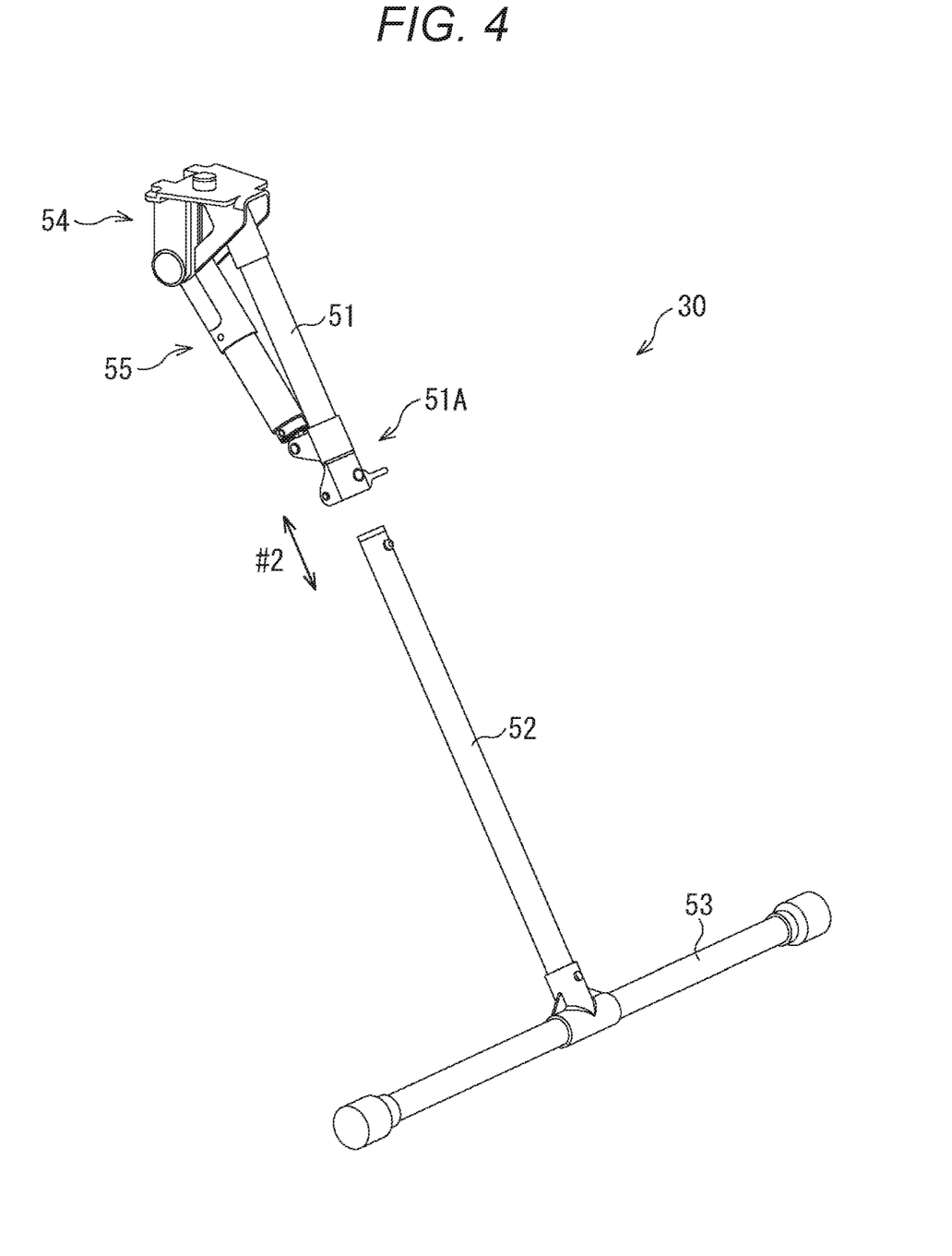
FIG. 4 is a view for describing attachment and detachment of a second leg portion.

Hereinafter, the state of the landing device 30 illustrated in FIG. 3 is referred to as a leg lifted state. During the flight of the drone 1, by bringing the landing device 30 into a leg lifted state, it is possible to prevent the landing device from disturbing the imaging by the aerial photography camera. Furthermore, as illustrated in FIG. 4, in the landing device 30, the second leg portion 52 is attached to the attachment member 51A (the second end portion of the first leg portion 51) so as to be detachable in a direction of arrow #2 in the drawing.

As described above, since the landing device 30 is configured such that the second leg portion 52 on the distal end side of the first leg portion 51 that can be lifted and lowered by the expansion and contraction link portion 55 is detachable, the length of the landing device 30 at the time of accommodating the drone 1 can be significantly shortened as compared with a configuration in which the landing device cannot be detached from the main body. That is, the drone 1 can be accommodated in a compact manner.

<3. Configuration of Attachment Member>

Hereinafter, the configuration of the attachment member 51A will be described.

Figure 5:
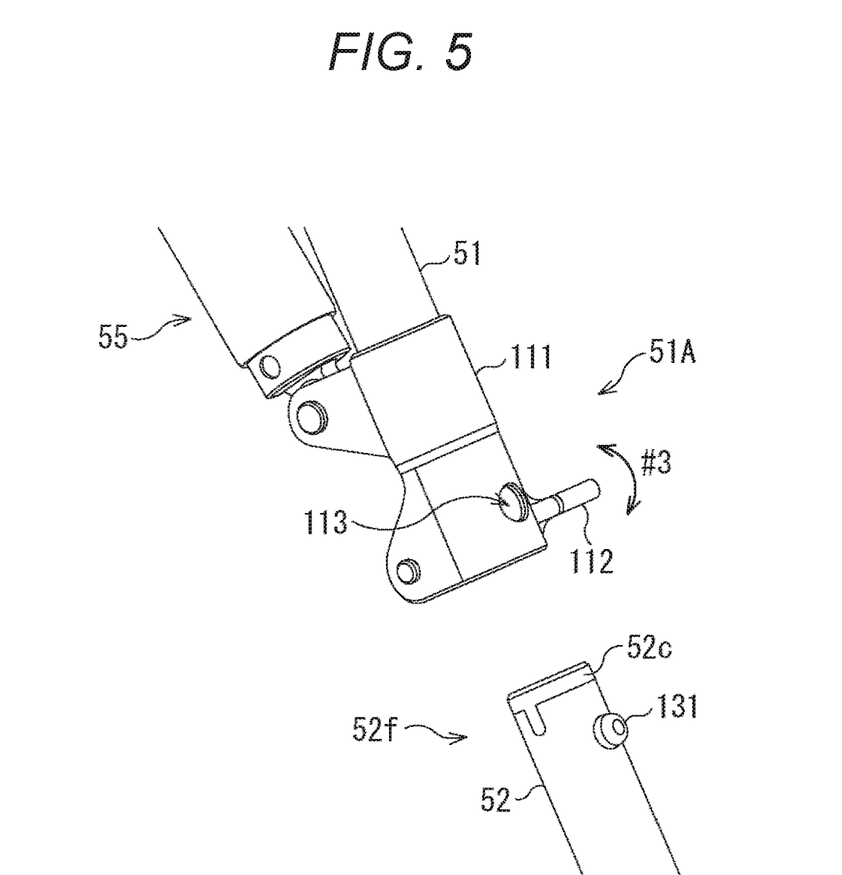
FIG. 5 is a perspective view illustrating a configuration example of an attachment member.
Figure 6:
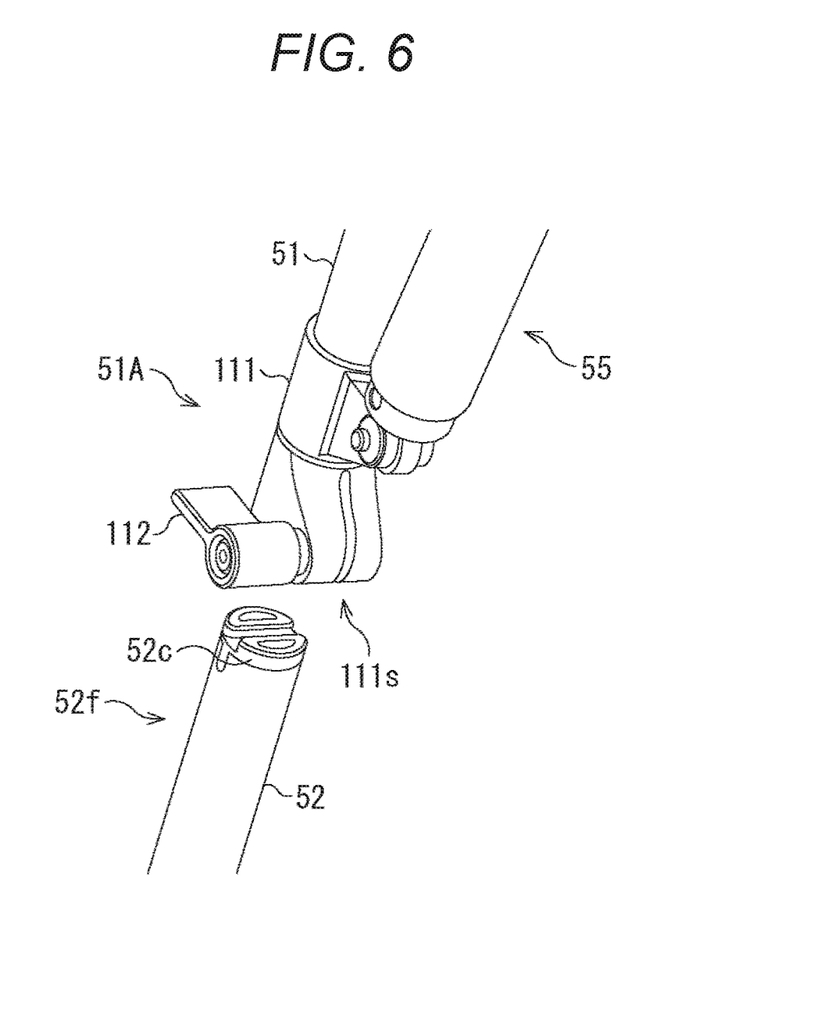
FIG. 6 is a perspective view illustrating a configuration example of an attachment member.

FIGS. 5 and 6 are perspective views illustrating configuration examples of the attachment member 51A.

In the landing device 30 in the leg lowered state, when the surface illustrated in FIG. 2 is the front side, FIG. 5 illustrates the attachment member 51A and the second leg portion 52 viewed from the front side, and FIG. 6 illustrates the attachment member 51A and the second leg portion 52 viewed from the rear side.

In FIGS. 5 and 6, the second leg portion 52 is in a state of being detached from the attachment member 51A, and a fitting portion 52f of the second leg portion 52, which is fitted to the attachment member 51A is illustrated. Furthermore, the distal end (the end portion on the first leg portion 51 side) of the second leg portion 52 formed in a hollow tubular shape (specifically, a hollow cylindrical shape) is sealed with a cap 52c including resin, for example.

The attachment member 51A includes a holding portion 111, an adjustment portion 112, and a locking hole 113.

The holding portion 111 has a hollow tubular shape, and includes resin, metal such as Al, or the like, and about half of the holding portion 111 is joined to the end portion of the first leg portion 51. The fitting portion 52f of the second leg portion 52 is attached to the attachment member 51A by being fitted to the inner diameter of the remaining half of the holding portion 111.

The adjustment portion 112 adjusts the inner diameter of the holding portion 111 so as to fasten the fitting portion 52f of the second leg portion 52. Specifically, as illustrated in FIG. 6, the holding portion 111 has a gap 111s at a portion (rear side) in a circumferential direction, and the adjustment portion 112 adjusts the inner diameter of the holding portion 111 by changing the width of the gap 111s.

Here, the details of the holding portion 111 and the adjustment portion 112 will be described with reference to FIG. 7.

Figure 7:
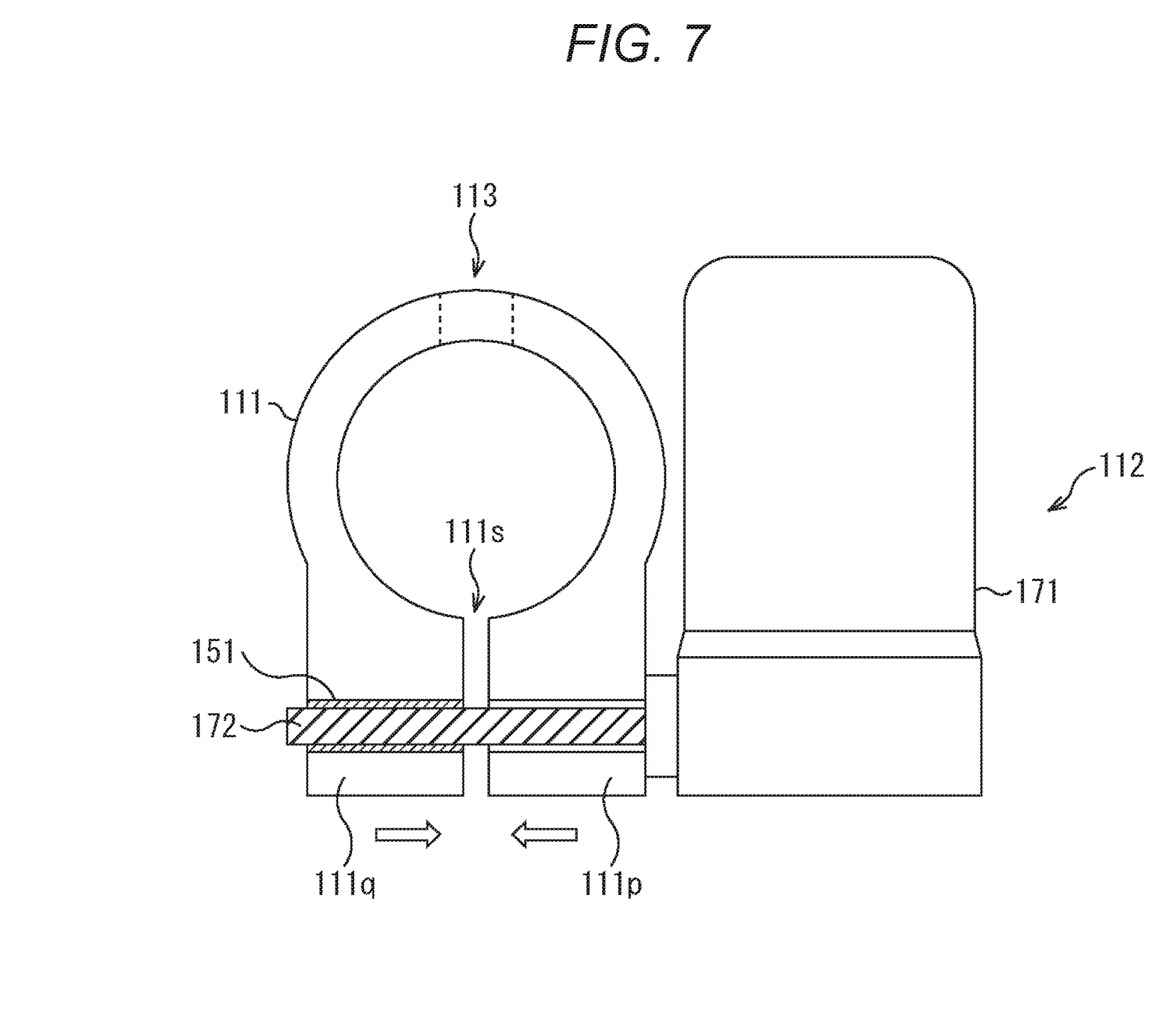
FIG. 7 is a view for describing details of a holding portion and an adjustment portion.

FIG. 7 illustrates a sectional view of the holding portion 111 viewed from the side to which the second leg portion 52 is attached, and the adjustment portion 112.

As illustrated in FIG. 7, the holding portion 111 has a pair of projection portions 111p and 111q that project in a radial direction from both ends of the gap 111s and face each other across the gap 111s. The adjustment portion 112 changes the width of the gap 111s by a screw member penetrating the pair of projection portions 111p and 111q across the gap 111s.

More specifically, a through-hole penetrating the pair of projection portions 111p and 111q across the gap 111s is formed in the projection portions 111p and 111q, and a female screw portion 151 is formed in the through-hole to be closer to the depth side (the projection portion 111q side) than the gap 111s. The adjustment portion 112 includes a lever 171, and includes a male screw portion 172 screwed to the female screw portion 151. That is, the lever 171 is configured as a clamping lever, and the male screw portion 172 is tightened to the female screw portion 151 by the rotation of the lever 171 in a direction of arrow #3 in FIG. 5, so that the width of the gap 111s is reduced. As the width of the gap 111s is reduced, the inner diameter of the holding portion 111 is decreased, and the fitting portion 52f of the second leg portion 52 is fastened.

With such a structure, the inner diameter of the holding portion 111 is adjusted only by rotating the lever 171, so that the second leg portion 52 can be attached and detached more easily.

Note that in the present embodiment, the lever 171 (adjustment portion 112) is configured as a clamping lever, but may include a fastening mechanism such as a cam lever or a ratchet lever.

Furthermore, as illustrated in FIG. 5, a protrusion portion 131 having a convex shape (push button shape) is provided on the front side of the fitting portion 52f of the second leg portion 52.

Figure 8:
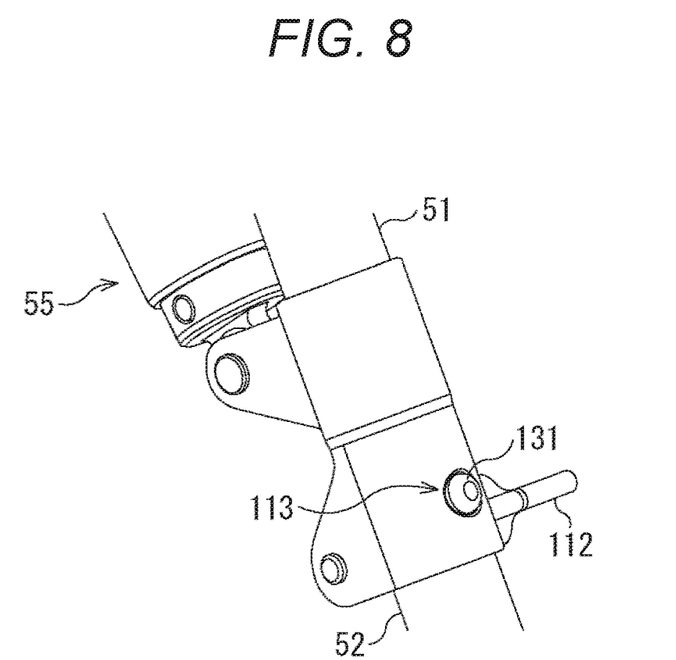
FIG. 8 is a perspective view for describing locking of a protrusion portion.

As illustrated in FIG. 8, the protrusion portion 131 is locked to the locking hole 113 formed on the front side of the first leg portion 51 in a state where the fitting portion 52f of the second leg portion 52 is fitted to the holding portion 111.

The protrusion portion 131 is pressed in the radial direction of the second leg portion 52 by an elastic body in the cylinder of the second leg portion 52 formed in the hollow tubular shape, so as to protrude to the fitting portion 52f of the second leg portion 52.

Figure 9:
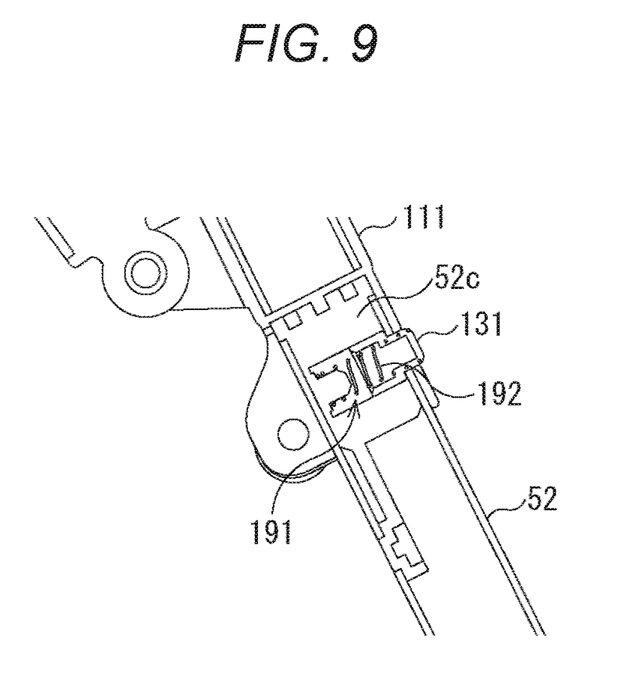
FIG. 9 is a side sectional view for describing a structure of the protrusion portion.

FIG. 9 is a side sectional view for describing a structure of the protrusion portion 131.

The cap 52c is sealed from the distal end of the second leg portion 52 to a predetermined depth, inside the distal end of the second leg portion 52 formed in a hollow tubular shape. A hole 191 through which the protrusion portion 131 can slide is formed in the cap 52c.

The hole 191 is provided with a spring 192 that presses the protrusion portion 131 in the radial direction of the second leg portion 52. The upper end portion of the protrusion portion 131 is locked to the locking hole 113 by being exposed to be pushable from the fitting portion 52f of the second leg portion 52, and the locking with the locking hole 113 is released by the upper end portion of the protrusion portion 131 being pushed into the cylinder of the second leg portion 52. Note that another elastic body may be used instead of the spring 192.

As described above, even in a case where the fitting portion 52f of the second leg portion 52 is fastened by adjusting the inner diameter of the holding portion 111 by the adjustment portion 112, the second leg portion 52 may fall off during the flight of the drone 1 due to looseness of fastening, forgetting to fasten, or insufficient fastening.

Therefore, by providing a mechanism for locking the protrusion portion 131 of the second leg portion 52 to the locking hole 113 of the attachment member 51A, it is possible to prevent the second leg portion 52 from falling off during the flight of the drone 1.

<4. Configuration and Operation of Expansion and Contraction Link Portion>

Hereinafter, the configuration and operation of the expansion and contraction link portion 55 will be described.

Figure 10:
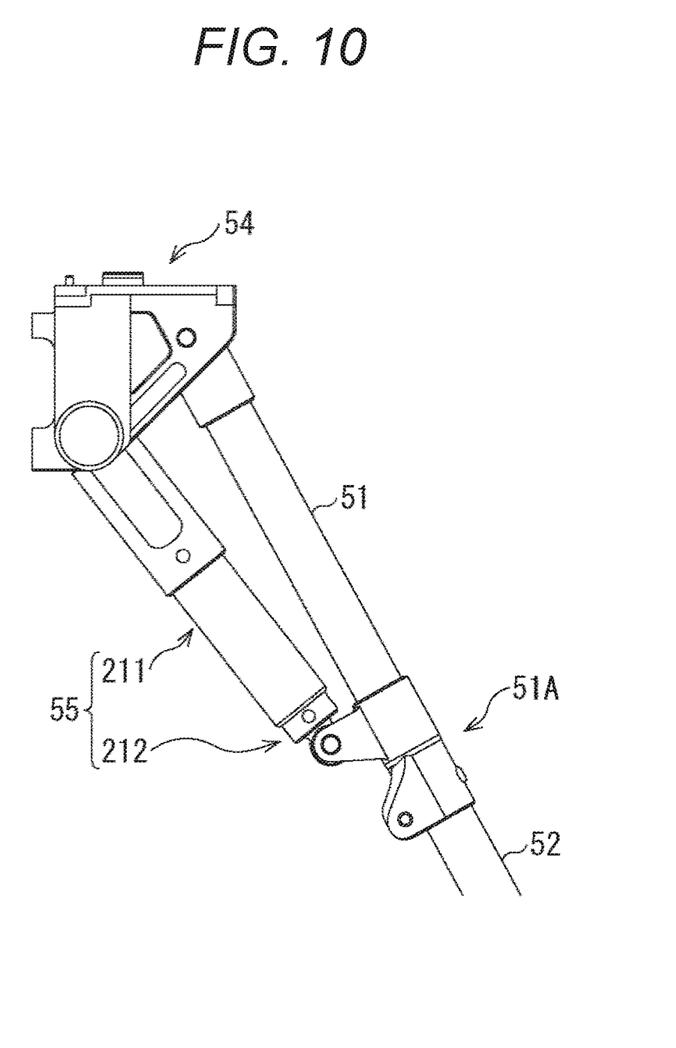
FIG. 10 is a side view illustrating a configuration example of an expansion and contraction link portion in a leg lowered state.
Figure 11:
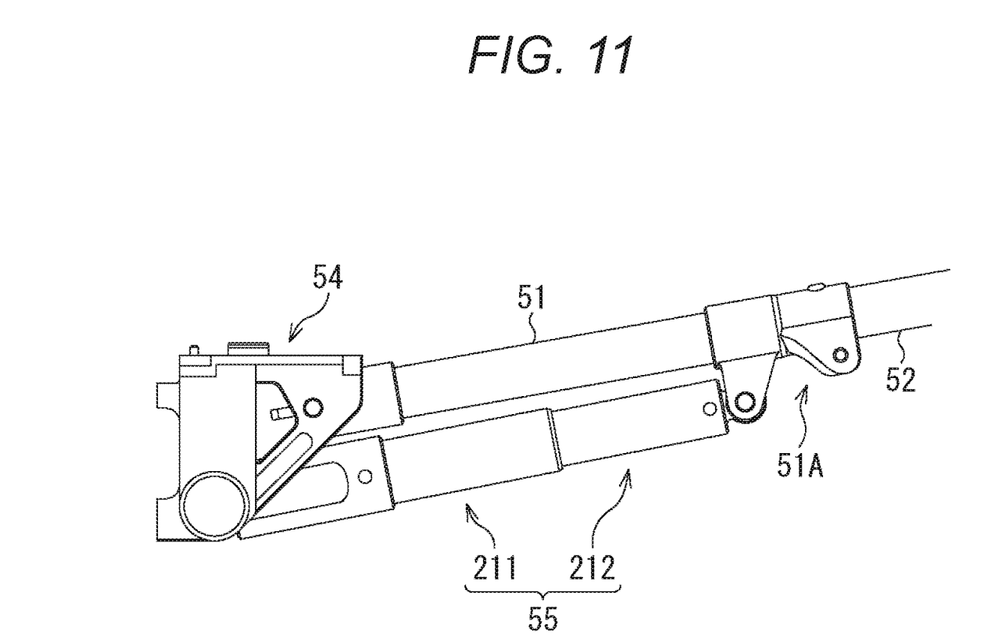
FIG. 11 is a side view illustrating a configuration example of an expansion and contraction link portion in a leg lifted state.

FIGS. 10 and 11 are side views illustrating configuration examples of the expansion and contraction link portion 55. FIG. 10 illustrates the expansion and contraction link portion 55 in a leg lowered state, and FIG. 11 illustrates the expansion and contraction link portion 55 in a leg lifted state.

The expansion and contraction link portion 55 includes a link fixing portion 211 and a link movable portion 212 that are formed in a hollow tubular shape.

One end of the link fixing portion 211 is connected to the connection portion 54. The other end of the link fixing portion 211 is provided with an opening into which the link movable portion 212 is inserted.

The link movable portion 212 is formed such that the outer diameter thereof is smaller than the inner diameter of the link fixing portion 211, and is slidably inserted into the opening of the link fixing portion 211 in the axial direction of the link fixing portion 211.

That is, in a case where the link movable portion 212 slides with respect to the link fixing portion 211, the expansion and contraction link portion 55 expands and contracts so that the first leg portion 51 can be lifted and lowered. Specifically, in a case where the link movable portion 212 is accommodated in the link fixing portion 211, the expansion and contraction link portion 55 contracts so that the landing device 30 is in a leg lowered state. Furthermore, the link movable portion 212 is exposed from the inside of the link fixing portion 211, and the expansion and contraction link portion 55 expands so that the landing device 30 is in a leg lifted state.

A linear actuator is provided inside the expansion and contraction link portion 55, and in a case where the linear actuator is driven, the link movable portion 212 slides with respect to the link fixing portion 211 so that the first leg portion 51 is lifted and lowered.

Figure 12:
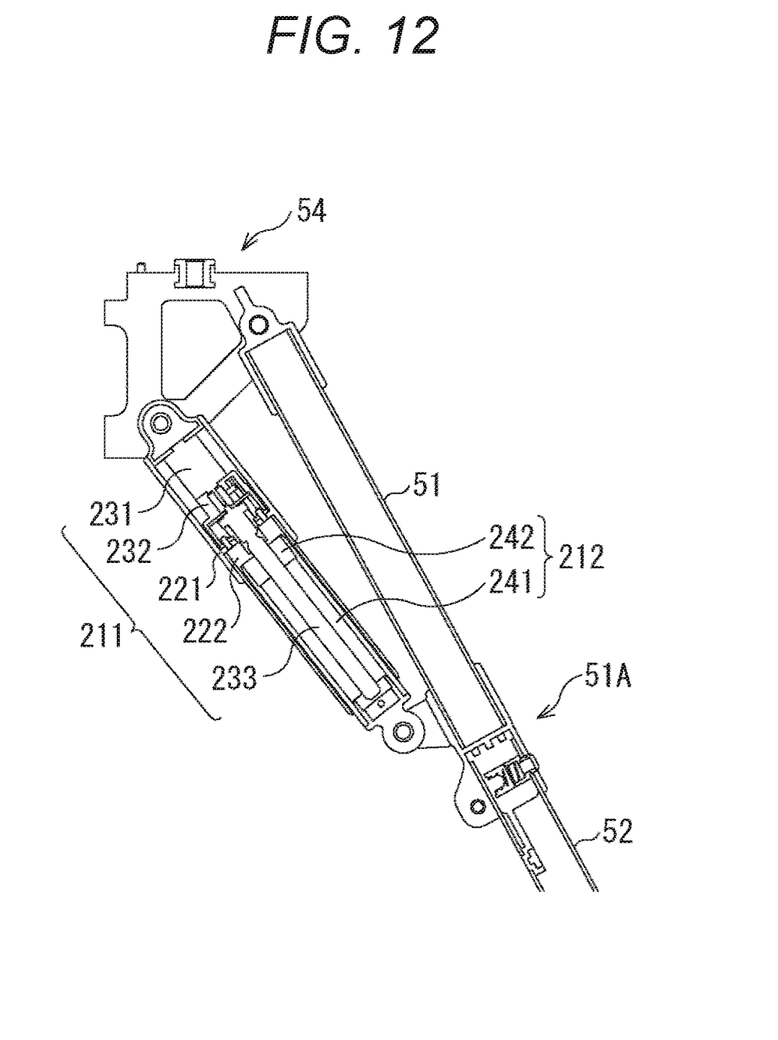
FIG. 12 is a side sectional view illustrating an internal structure example of an expansion and contraction link portion in a leg lowered state.
Figure 13:
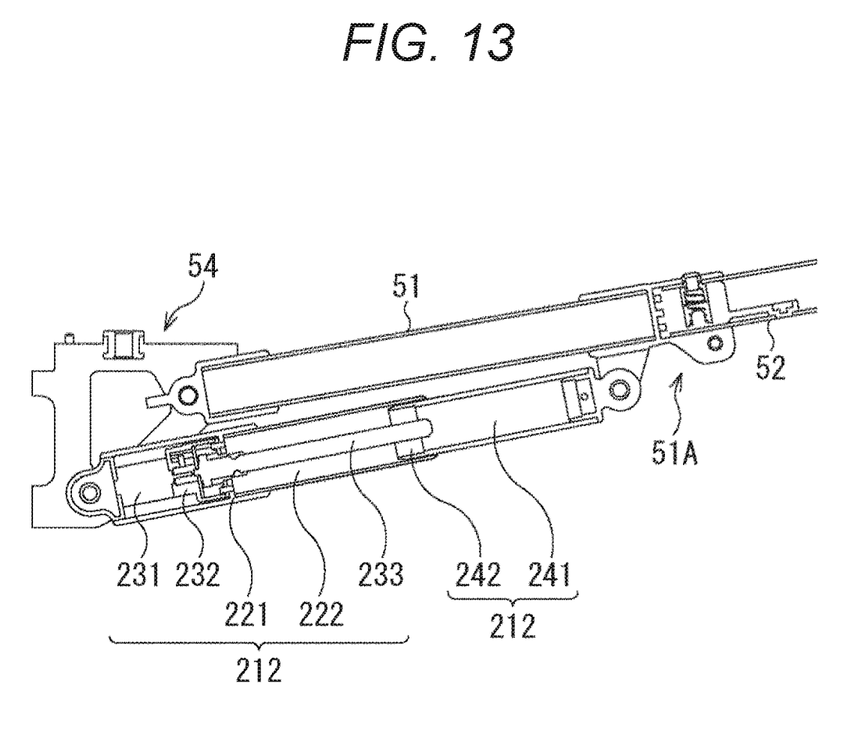
FIG. 13 is a side sectional view illustrating an internal structure example of an expansion and contraction link portion in a leg lifted state.

FIGS. 12 and 13 are side sectional views illustrating internal structure examples of the expansion and contraction link portion 55. FIG. 12 illustrates the expansion and contraction link portion 55 in a leg lowered state, and FIG. 13 illustrates the expansion and contraction link portion 55 in a leg lifted state.

The link fixing portion 211 includes housings 221 and 222, a motor 231, a gear box 232, and a male screw portion 233. Furthermore, the link movable portion 212 includes a housing 241 and a female screw portion 242. The above-described linear actuator is realized by the motor 231, the gear box 232, the male screw portion 233, and the female screw portion 242.

The housing 221 of the link fixing portion 211 is formed in a hollow tubular shape, and one end thereof is connected to the connection portion 54. The housing 222 is joined to the other end of the housing 221. The housing 222 is also formed in a hollow tubular shape, and an opening into which the housing 241 of the link movable portion 212 is inserted is provided at one end of the housing 222 on the side to which the housing 221 is not joined. The housings 221 and 222 may be integrally formed.

Inside the housings 221 and 222 (link fixing portion 211), the motor 231, the gear box 232, and the male screw portion 233 are provided in this order from the connection portion 54 side.

The motor 231 and the gear box 232 rotationally drive the male screw portion 233 extending in the axial direction of the housings 221 and 222.

A plurality of gears for transmitting a driving force of the motor 231 to the male screw portion 233 is provided inside the gear box 232. The gear box 232 is configured as a speed reduction mechanism that generates a braking force with respect to the rotational force of the motor 231, and a plurality of gears provided inside the gear box may adopt a spur gear structure or a planetary gear structure.

In a case where the driving force of the motor 231 is transmitted through the gear of the gear box 232, the male screw portion 233 is rotationally driven about the extending direction thereof. Power and a control signal for driving the motor 231 are supplied from a controller and a battery unit inside the main body 10 via a harness (not illustrated).

The female screw portion 242 screwed to the male screw portion 233 is fixedly provided at an end portion inside the housing 241 (link movable portion 212), which is on the connection portion 54 side. The male screw portion 233 and the female screw portion 242 constitute a so-called lead screw, and in a case where the male screw portion 233 is rotationally driven by the motor 231, the female screw portion 242 is moved in the axial direction (extending direction) of the male screw portion 233.

As described above, the linear actuator that is realized by the motor 231, the gear box 232, and the male screw portion 233 and the female screw portion 242 constituting the lead screw is driven, and the link movable portion 212 slides with respect to the link fixing portion 211 so that the first leg portion 51 can be lifted and lowered.

Note that the expansion and contraction mechanism of the expansion and contraction link portion 55 is not limited to the above-described structure, and other structures may be adopted.

The embodiments of the present technology are not limited to the above-described embodiments, and various modifications can be made without departing from the gist of the present technology.

Furthermore, the effects described in the specification are merely examples and are not limited, and may have other effects.

Moreover, the present disclosure can have the following configurations.

(1) A landing device including:
  a first leg portion that is swingable with a first end portion on a main body side of an unmanned aerial vehicle as an axis; and
  a second leg portion that is detachably attached to a second end portion of the first leg portion such that the second leg portion extends in an axial direction of the first leg portion.

(2) The landing device described in (1), further including:
  an expansion and contraction link portion that constitutes a link mechanism together with the first leg portion, and lifts and lowers the first leg portion to which the second leg portion is attached.

(3) The landing device described in (1) or (2), further including:
  an attachment member that is provided at the second end portion of the first leg portion and has a holding portion having a hollow tubular shape,
  in which the second leg portion is fitted to an inner diameter of the holding portion.

(4) The landing device described in (3),
  in which the attachment member has an adjustment portion that adjusts the inner diameter such that a fitting portion of the second leg portion is fastened.

(5) The landing device described in (4),
  in which the holding portion has a gap at a portion in a circumferential direction, and
  the adjustment portion adjusts the inner diameter by changing a width of the gap.

(6) The landing device described in (5),
  in which the holding portion has projection portions that project in a radial direction from both ends of the gap and face each other across the gap, and
  the adjustment portion changes a width of the gap by a screw member that penetrates the projection portions across the gap.

(7) The landing device described in (6),
  in which the adjustment portion includes a lever that has a male screw portion screwed to a female screw portion that is formed in the through-hole penetrating the projection portions across the gap to be closer to a depth side than the gap.

(8) The landing device described in (7),
  in which the lever is a clamping lever.

(9) The landing device described in (7),
  in which the lever is a cam lever.

(10) The landing device described in any one of (4) to (9),
  in which the attachment member further has a locking hole that locks a protrusion portion having a convex shape, which is provided to a fitting portion of the second leg portion.

(11) The landing device described in (10),
  in which the protrusion portion is pressed in a radial direction by an elastic body in a cylinder of the second leg portion formed in a hollow tubular shape to protrude to the fitting portion.

(12) The landing device described in any one of (2) to (11),
  in which the expansion and contraction link portion expands and contracts by a linear actuator to lift and lower the first leg portion to which the second leg portion is attached.

(13) The landing device described in (12),
  in which the linear actuator includes a motor and a lead screw.

REFERENCE SIGNS LIST

1 Drone
30 Landing device
51 First leg portion
51A Attachment member
52 Second leg portion
53 Grounding portion
54 Connection portion
55 Expansion and contraction link portion
111 Holding portion
111*p*, 111*q* Projection portion
111*s* Gap
112 Adjustment portion 113 Locking hole
131 Protrusion portion
151 Female screw portion
171 Lever
172 Male screw portion
191 Hole
192 Spring
211 Link fixing portion
212 Link movable portion
231 Motor
232 Gear box
233 Male screw portion
242 Female screw portion

The invention claimed is:

1. A landing device, comprising:
a first leg portion that is swingable with a first end portion on a main body side of an unmanned aerial vehicle as an axis;
a second leg portion that is detachably attached to a second end portion of the first leg portion such that the second leg portion extends in an axial direction of the first leg portion; and
an expansion and contraction link portion that constitutes a link mechanism together with the first leg portion, wherein
the expansion and contraction link portion is configured to lift and lower the first leg portion to which the second leg portion is attached,
the first leg portion is lifted and lowered based on a link movable portion configured to slide with respect to a linear actuator,
the expansion and contraction link portion is further configured to expand and contract based on the linear actuator to lift and lower the first leg portion to which the second leg portion is attached, and
the linear actuator includes a motor and a lead screw.

2. The landing device according to claim 1, further comprising:
an attachment member at the second end portion of the first leg portion, wherein
the attachment member has a holding portion having a hollow tubular shape, and
the second leg portion is fitted to an inner diameter of the holding portion.

3. The landing device according to claim 2, wherein
the attachment member has an adjustment portion configured to adjust the inner diameter such that a fitting portion of the second leg portion is fastened.

4. The landing device according to claim 3, wherein
the holding portion has a gap at a portion in a circumferential direction, and
the adjustment portion is further configured to adjust the inner diameter based on a change of a width of the gap.

5. The landing device according to claim 4, wherein
the holding portion has projection portions that project in a radial direction from both ends of the gap and face each other across the gap, and
the adjustment portion is further configured to change the width of the gap based on a screw member configured to penetrate the projection portions across the gap.

6. The landing device according to claim 5, wherein
the projection portions include a through-hole that penetrates the projection portions across the gap, and
the adjustment portion includes a lever that has a male screw portion screwed to a female screw portion in the through-hole to be closer to a depth side than the gap.

7. The landing device according to claim 6, wherein the lever is a clamping lever.

8. The landing device according to claim 6, wherein the lever is a cam lever.

9. The landing device according to claim 3, wherein
the attachment member further has a locking hole configured to lock a protrusion portion having a convex shape, and
the attachment member is on the fitting portion of the second leg portion.

10. The landing device according to claim 9, wherein
the protrusion portion is configured to be pressed in a radial direction by an elastic body in a cylinder of the second leg portion in the hollow tubular shape to protrude to the fitting portion.

11. The landing device according to claim 1, wherein the link movable portion includes a screw to connect the lead screw.

* * * * *